United States Patent [19]

Brzozowski

[11] Patent Number: 4,581,674

[45] Date of Patent: Apr. 8, 1986

[54] THERMAL FUSE DEVICE FOR PROTECTING ELECTRICAL FIXTURES

[75] Inventor: Steven J. Brzozowski, Saratoga, N.Y.

[73] Assignee: General Electric Company, Schenectady, N.Y.

[21] Appl. No.: 683,124

[22] Filed: Dec. 18, 1984

Related U.S. Application Data

[63] Continuation of Ser. No. 480,563, Mar. 30, 1983, abandoned.

[51] Int. Cl.[4] .............................................. H02H 5/04

[52] U.S. Cl. .................................. 361/104; 361/103; 337/159; 337/290; 340/590; 340/638; 340/639; 340/656

[58] Field of Search ....................... 361/103, 104, 106; 340/590, 638, 639, 656; 337/159, 290, 295

[56] References Cited

U.S. PATENT DOCUMENTS

| | | | |
|---|---|---|---|
| 2,909,630 | 10/1959 | Palmer | 337/290 |
| 2,910,625 | 10/1959 | Carpenter | 361/104 X |
| 3,169,239 | 2/1965 | Lacey | 340/638 |
| 3,365,559 | 1/1968 | Sherwood | 337/290 |
| 3,368,110 | 2/1968 | Taylor | 361/104 X |
| 3,452,252 | 6/1969 | Mapham | 361/104 X |
| 3,839,692 | 10/1974 | Plasko | 361/106 X |
| 3,840,781 | 10/1974 | Brown | 361/104 |
| 4,023,071 | 5/1977 | Fussell | 361/111 X |
| 4,271,446 | 6/1981 | Comstock | 340/638 X |
| 4,296,398 | 10/1981 | McGalliard | 361/104 X |
| 4,310,837 | 1/1982 | Kornrumpf et al. | 340/598 X |
| 4,500,862 | 2/1985 | Shedd | 361/104 X |
| 4,531,806 | 7/1985 | Hsieh | 337/290 X |

*Primary Examiner*—G. P. Tolin
*Assistant Examiner*—Derek S. Jennings
*Attorney, Agent, or Firm*—George B. Fox; James C. Davis, Jr.; Bernard J. Lacomis

[57] ABSTRACT

A protection device for interrupting power to a load connected to a pair of terminals when the temperature of a terminal exceeds a predetermined threshold comprises an alloy having a eutectic at the predetermined threshold and a neon gas-filled glow tube electrically coupled in parallel with the thermal fuse. The thermal fuse is electrically serially connected between the terminal and the load and thermally coupled to the terminal so that an excessive temperature rise at the terminal causes the fuse to melt, thereby removing power from the load and causing the glow tube to be lit.

23 Claims, 4 Drawing Figures

THERMAL FUSE DEVICE FOR PROTECTING ELECTRICAL FIXTURES

This application is a continuation of application Ser. No. 480,563, filed 3/30/83, now abandoned.

BACKGROUND OF THE INVENTION

This invention relates to electrical protection apparatus, and more particularly to a low cost indicator of excessive temperature at the terminals of an electrical device and temperature responsive circuit interrupter.

Most items of electrical apparatus intended for operation from commercial power sources characteristically employ terminations for the wiring that supply them with power. For proper and safe operation, these items of electrical apparatus must be wired correctly at their terminations. An improperly terminated conductor, whether the termination be the contacting blade surfaces of a plug-in type connection or a terminal connecting a stranded or solid conductor, may overheat at such termination when carrying current, bringing with it the hazard of damaging any combustible material that may happen to be in contact with the overheated terminal. If detected before an excessive temperature rise has occurred, however, this hazard can be overcome by opening the circuit which brought it about, and then removed by correcting the wiring. Therefore, it would be desirable to provide a simple, low cost temperature responsive circuit interrupter and indicator that can reliably remove electrical current from a circuit after the temperature of the electrical wiring thereof has exceeded a predetermined temperature threshold in order to avoid potential hazard due to electrical wiring overheating and to prevent continued overheating and that can signify that an excessive temperature rise has occurred.

Accordingly, one object of the invention is to provide low cost apparatus for interrupting the current flow of current-carrying electrical conductors when the temperature thereof exceeds a predetermined threshold.

Another object is to provide apparatus for reliably identifying improper termination of electrical conductors without need for any power supply other than the line voltage.

Another object is to provide apparatus which signals an indication of overheating in an electrical circuit.

SUMMARY OF THE INVENTION

In accordance with the present invention, a high temperature circuit interrupter for an electrical load circuit connected to at least one termination comprises thermal responsive means electrically serially connected between the at least one termination and the electrical load circuit and thermally coupled to the at least one termination for interrupting the electrical power path to the electrical load circuit from the at least one termination when the temperature of the at least one termination exceeds a predetermined temperature threshold and indicating means electrically coupled in parallel with the thermal responsive means. In a preferred embodiment the thermal responsive means comprises an alloy having a eutectic.

BRIEF DESCRIPTION OF THE INVENTION

DETAILED DESCRIPTION

Figure 1:
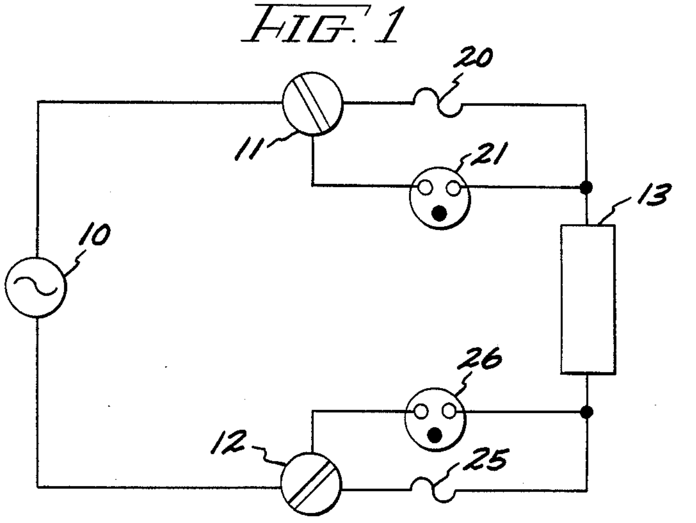
FIG. 1 is a schematic diagram of one embodiment of the invention shown connected to terminations supplying power to a load circuit.

FIG. 1 illustrates the circuit embodying the instant invention. A power source 10, such as the conventional 110–120 volt, 60 Hz., AC type common in the United States, is connected to a load 13 through a pair of terminations 11 and 12 and fusible elements or thermal fuses 20 and 25, respectively. In many instances, these terminations are of the screw-down terminals type which contact the wires with a compressive force. In the majority of such instances, the contact is properly terminated and provides a path of very low resistance for the load current, so that overheating is not likely to occur. In those few instances where the contact is not properly terminated, however, a path of much higher resistance may be presented to the load current as wherein, for example, an insufficient number of strands in the wire may contact with the terminal because they were cut too short or are bent away from the terminal, or where some amount of insulation exists between the terminal and the wire. The high resistance path, if carrying sufficient current, may undergo a large temperature rise because of the power loss occurring therein. The temperature thus reached conceivably could exceed the safe temperature of many combustible materials which, if in contact with the wire or termination in the region of high power loss, might be damaged. To provide circuit current interruption to load 13 and warning of the potential safety hazard, thermal fuses 20 and 25 are connected in parallel with on/off indicators, typically neon gas filled glow tubes 21 and 26, respectively, in series with load 13. Thermal fuses 20 and 25 are situated sufficiently close to terminals 11 and 12, respectively, as to be thermally responsive (or thermally coupled) thereto. As the temperature of the wiring and/or other metallic portions of the conducting path rises above the melting temperature of thermal fuse 20 or 25, thermal fuse 20 or 25, respectively, will rupture, thus interrupting the current flow therethrough and causing a voltage to be impressed across glow tube 21 or 25, respectively. The glow tube having a voltage impressed thereacross becomes lit, indicating that the thermal fuse has ruptured from exposure to an abnormally high temperature, thereby signifying that the wiring at one of terminations 11 or 12 is overheated. Corrective action can then be taken in order to eliminate the potential for a dangerous fire to occur.

In order to ensure reliable indication of overheating, a eutectic composition of an alloy for the fuse is used. An alloy of indium and silver is employed as a preferred material for thermal fuses 20 and 25. The particular alloy used is preferably about 97% indium and about 3% silver by weight having a eutectic at 143° C. and is commercially available from Indium Corporation of America. A eutectic is the lowest temperature at which an alloy will exhibit a phase change e.g. solid to liquid, and thus must be lower than the melting point of any individual constituent of the alloy. Further, as the temperature at which the eutectic exhibits a phase change is approached from say a lower temperature, the phase change occurs very rapidly when the phase change temperature is reached, unlike pure metals or alloys not exhibiting a eutectic in which melting may occur over a range of temperatures. Also to be considered in choosing a suitable material for thermal fuses 20 and 25 are the electrical properties thereof. Electrical properties of materials selected for thermal fuses 20 and 25 must be relatively close to those of the wiring material so that heat caused by resistance losses in each fuse due to current flow therethrough is not excessive for sizes of thermal fuses 20 and 25 which are compatible with the apparatus being protected. The preferred alloy of indium and silver of the present invention has a conductivity about one-fifth that of copper. Thus the cross-sectional area of thermal fuses 20 and 25 need only be about five times that of copper wire in order to maintain the same relative internal heating. Unlike a conventional circuit protection fuse which generates internal heat due to resistance losses when a current is flowing therethrough, and self destructs when the heat generated and therefore the current is greater than a predetermined threshold, thermal fuses 20 and 25 respond mainly to temperatures external to the fuse. Of course, alloys exhibiting a eutectic at a temperature different from that of the preferred alloy of the present invention may be used should a different protection temperature be desired, if the above considerations are included in the section of the alloy.

Figure 2:
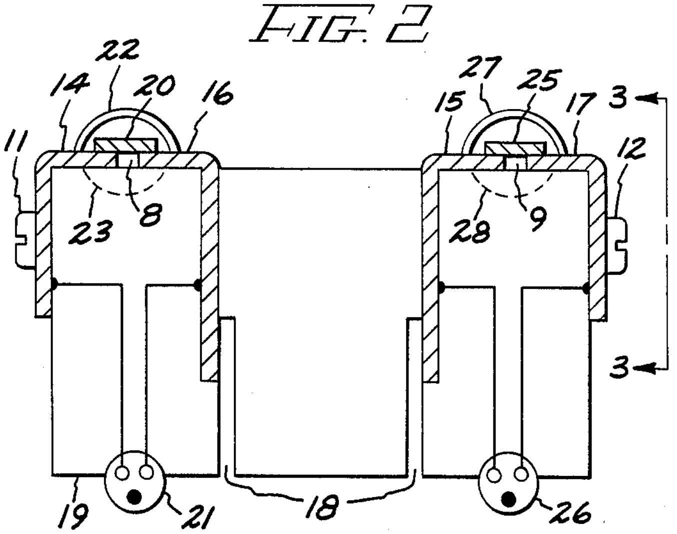
FIG. 2 is a part sectional schematic view of the invention fabricated in the form of a duplex receptacle useful for sensing overheating therein.

FIG. 2 illustrates a high temperature indicating device incorporating the circuitry of FIG. 1 with like reference numbers designating like components. The device may comprise a modified conventional duplex receptacle having slots 18 for receiving the prongs of a conventional electrical plug (not shown). Additionally, a slot (not shown) for receiving the grounding prong (not shown) of a conventional plug may also be provided. Indicating devices 21 and 26 are electrically connected between conductor plates 14 and 16 and between conductor plates 15 and 17, respectively, and may protrude from support 19 so as to be visible. Conductor plates 14, 15, 16 and 17 may each comprise a highly conducting material such as brass or copper. Conductor plates 14 and 17 are electrically coupled to terminals 11 and 12, respectively. A portion of conductor plates 15 and 16 located adjacent slots 18 are adapted to provide electrical contact to prongs inserted into slots 18. Conductor plates 14 and 16 are electrically isolated from each other by a gap 8 therebetween and conductor plates 15 and 17 are electrically isolated by a gap 9 therebetween. Thermal fuse 20 is connected across gap 8 to conductor plates 15 and 17, as by welding, so as to provide electrical continuity therebetween and thermal fuse 25 is connected across gap 9 to conductor plates 15 and 17, as by welding, so as to provide electrical continuity therebetween. The entire assembly may be supported by a single piece 19 of plastic or nylon into which it is molded.

Figure 3:
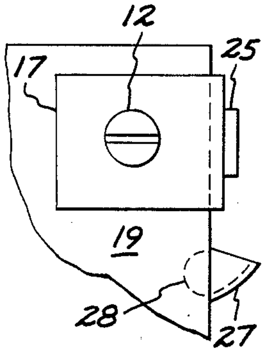
FIG. 3 is a partial schematic view of the apparatus of FIG. 2.

FIG. 3 illustrates a partial schematic plan view rotated 90° looking in the direction of the arrows of line 3—3 of FIG. 2. The apparatus of FIG. 2 is expected to be used with a substantially vertical orientation as shown in FIG. 3. Thus when thermal fuse 25 melts, molten metal flows downward under the force of gravity. Trap 27, which is preferably positioned in an upwardly slanting direction from support 19 and preferably has a margin extending vertically beyond the surface of thermal fuse 25, collects molten metal from thermal fuse 25. The volume between the upper surface of trap 27 and support 19 is large enough to retain all the expected molten metal from thermal fuse 25 without overflowing. Trap 27 is also situated such that any molten metal contained therein does not contact conductor plates 15 and 17. A recess 28 may be provided from the point at which trap 27 contacts support 19 in order to increase the molten metal retaining capacity of trap 27. An identical trap 22 and recess 23 is provided for thermal fuse 20.

Figure 4:
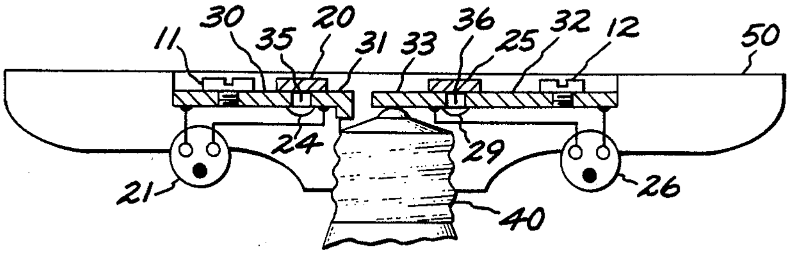
FIG. 4 is a part sectional schematic view of the invention useful for sensing overheating in a typical light fixture.

FIG. 4 illustrates a high temperature indicating device incorporating the circuitry of FIG. 1, with like reference numbers designating like components. A base 50 has a suitable socket 40 for receiving a conventional lamp or light bulb 45 connected thereto. Partially unenveloped by base 50 are indicators 21 and 26 so as to be visible. Indicator 21 is electrically coupled to conductor plates 30 and 31 and indicator 26 is electrically coupled to conductor plates 32 and 33. Terminals 11 and 12 are connected to conductor plates 30 and 32, respectively. Conductor plates 30 and 31 are electrically isolated from each other by a gap 35 therebetween and conductor plates 32 and 33 are electrically isolated from each other by a gap 36 therebetween.

Thermal fuse 20 is connected across gap 35 to conductor plates 30 and 31, as by welding, so as to provide electrical conductivity therebetween and thermal fuse 25 is connected across gap 36 to conductor plates 32 and 33, as by welding, so as to provide electrical conductivity therebetween. Base 50 is expected to be used with an orientation such that conductor plates 30, 31, 32 and 33 are substantially horizontal and facing upward. Dimples or recesses 24 and 29 are provided for thermal fuses 20 and 25, respectively, to retain molten metal therefrom. Recesses 24 and 29 are of sufficient size to retain all expected molten metal such that any molten metal retained therein does not contact conductor plates 14 and 16, and 15 and 17, respectively.

In both configurations of FIG. 2 and FIG. 4, when the protection threshold temperature (as determined by the eutectic of the alloy used) is exceeded, thermal fuse 20 or 25 melts, thereby interrupting the current path between its respective conductor plates, removing power from load 13 and impressing a voltage across indicator 21 or 26, respectively causing that indicator to light. Thus heating at terminals 11 and 12 due to current flow is eliminated.

While the instant invention has been described with respect to using a neon glow lamp for the over temperature indication, it is also possible to use a small piezoelectric sounder to produce an audible alarm on overtemperature. Alternatively, it is also feasible to drive a high impedance coil in an electromagnetic sounder using the technique described herein, or to drive any of a variety of other outputs such as relays, thyristors and transistors. Also, the invention is not limited to any particular voltage (as long as there is sufficient voltage to ignite the glow tube or drive whatever other indicator device may be employed) and hence can be used on 220/240 volt electrical systems at AC frequencies other than at 60 Hz., and can be used in DC electrical systems also. Finally, the power to the load is interrupted when an overtemperature condition is sensed regardless of the particular voltage, since the thermal fuses are responsive to temperature.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A high temperature circuit interrupter for an electrical load circuit connected to at least one termination, comprising:

(a) first and second electrical conductor means for providing an electrical power path from said termination to said circuit interrupter, and for providing an electrical power path from said circuit interrupter to said load circuit respectively with said first conductor means for electrically coupling to said termination and said second conductor means for electrically coupling to said load circuit;

(b) thermal responsive means electrically serially connected between said first and second conductor means and thermally coupled to said at least one termination for interrupting the electrical power path to said electrical load circuit from said at least one termination when the temperature of said at least one termination exceeds a predetermined temperature threshold, said thermal responsive means having a cross-sectional area sufficient to conduct the same electrical current as either of said first or second conductor means while maintaining substantially the same relative internal heating due to resistance losses as either of said first or second conductor means; and (c) indicating means electrically coupled in parallel with said thermal responsive means.

2. The apparatus of claim 1 wherein said thermal responsive means comprises an alloy having a eutectic composition.

3. The apparatus of claim 2 wherein said alloy comprises silver and indium.

4. The apparatus of claim 3 wherein said alloy comprises about 97% indium and about 3% silver by weight.

5. The apparatus of claim 1 wherein said indicating means comprises a gas-filled glow tube.

6. The apparatus of claim 2 wherein said indicating means comprises a gas-filled glow tube.

7. An electrical supply station comprising:

(a) a support member;

(b) terminal means coupled to said support member for coupling voltage to said station;

(c) electrical conductor means for providing said voltage to a load from said terminal means, wherein said electrical conductor means comprises a first and second portion having said first and second portions electrically isolated from each other and said first portion coupled to said terminal means; and (d) thermal responsive means thermally coupled to said terminal means and electrically coupled to said conductor means for providing electrical continuity between said first and second portions thereof and for interrupting electrical continuity between said first and second portions when the temperature of said terminal means exceeds a predetermined threshold, said thermal responsive means having a cross-sectional area sufficient to conduct the same electrical current as either of said first or second conductor means while maintaining substantially the same relative internal heating due to resistance losses as either of said first or second conductor means.

8. The apparatus of claim 7 wherein said thermal responsive means comprises an alloy having a eutectic composition.

9. The apparatus of claim 8 wherein said alloy comprises silver and indium.

10. The apparatus of claim 9 wherein said alloy comprises about 97% indium and about 3% silver by weight.

11. The apparatus of claim 7 further comprising indicating means electrically coupled in parallel with said thermal responsive means.

12. The apparatus of claim 11 wherein said indicating means comprises a gas-filled glow tube.

13. The apparatus of claim 8 further comprising collecting means coupled to said support member for retaining said alloy.

14. A supply station for providing electrical power to a lamp comprising:

(a) retainer means for supporting the lamp;

(b) terminal means coupled to said retainer means for providing voltage to said station;

(c) electrical conductor means for providing said voltage to the lamp from said terminal means, wherein said electrical conductor means comprises a first and second portion having said first and second portions electrically isolated from each other and said first portion coupled to said terminal means; and (d) thermal responsive means thermally coupled to said conductor means for providing electrical continuity between said first and second portions thereof and for interrupting electrical continuity between said first and second portions when the temperature of said terminal means exceeds a predetermined threshold, said thermal responsive means having a cross-sectional area sufficient to conduct the same electrical current as either of said first or second conductor means while maintaining substantially the same relative internal heating due to resistance losses as either of said first or second conductor means.

15. The apparatus of claim 14, wherein said thermal responsive means comprises an alloy having a eutectic composition.

16. The apparatus of claim 15 wherein said alloy comprises silver and indium.

17. The apparatus of claim 16 wherein said alloy comprises about 97% indium and about 3% silver by weight.

18. The apparatus of claim 14 further comprising indicating means electrically coupled in parallel with said thermal responsive means.

19. The apparatus of claim 18 wherein said indicating means comprises a gas-filled glow tube.

20. The apparatus of claim 15 further comprising collecting means coupled to said support member for retaining said alloy.

21. A high temperature circuit interrupter for decoupling an electrical load from an electrical supply station upon the occurrence of a predetermined ambient temperature threshold, said load and said supply station each including first and second electrical conductors, having a first coefficient of electrical conductivity, for providing an electrical power path thereto, said interrupter comprising:

a thermal fuse, having a second coefficient of electrical conductivity, and coupled to each said first conductor of said load and said supply station for providing electrical continuity therebetween, said thermal fuse having a eutectic melting point corresponding to said predetermined temperature threshold for melting said fuse upon the occurrence of said predetermined temperature and thereby decoupling said supply station from said load, said thermal fuse further having a cross sectional area proportional to that of said conductor by the ratio of said first coefficient to said second coefficient such that said fuse will conduct the same electrical current as said conductors while maintaining substantially the same relative internal heating due to resistance losses as said conductors.

22. The apparatus of claim 21, wherein said thermal fuse comprises an alloy of silver and indium.

23. The apparatus of claim 22, wherein said alloy comprises about 97% indium and about 3% silver, by weight.

* * * * *